US012182630B2

(12) United States Patent
Palavalli et al.

(10) Patent No.: US 12,182,630 B2
(45) Date of Patent: *Dec. 31, 2024

(54) POLICY CONSTRAINT FRAMEWORK FOR AN SDDC

(71) Applicant: VMware LLC, Palo Alto, CA (US)

(72) Inventors: Amarnath Palavalli, Fremont, CA (US); Sachin Mohan Vaidya, Pune (IN); Pavlush Margarian, Dublin, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,306

(22) Filed: Jul. 28, 2023

(65) Prior Publication Data

US 2023/0367650 A1 Nov. 16, 2023

Related U.S. Application Data

(63) Continuation of application No. 17/176,191, filed on Feb. 16, 2021, now Pat. No. 11,748,170, which is a (Continued)

(30) Foreign Application Priority Data

Jun. 15, 2018 (IN) .............................. 201841022440

(51) Int. Cl.
  *G06F 9/50* (2006.01)
  *H04L 9/40* (2022.01)
  (Continued)

(52) U.S. Cl.
  CPC .......... *G06F 9/5077* (2013.01); *G06F 9/5011* (2013.01); *H04L 63/0263* (2013.01);
  (Continued)

(58) Field of Classification Search
  CPC . G06F 9/5077; H04L 63/101; H04L 63/0263; H04L 67/1089
  (Continued)

(56) References Cited

U.S. PATENT DOCUMENTS 6,697,360 B1 2/2004 Gai et al.
6,765,914 B1 7/2004 Jain et al.
(Continued)

FOREIGN PATENT DOCUMENTS

AU 2004227600 B2 5/2009
AU 2019287434 A1 2/2021
(Continued)

OTHER PUBLICATIONS

Author Unknown, "Assign Memory Resources to Containers and Pods," Oct. 17, 2020, 7 pages.
(Continued)

*Primary Examiner* — Lan Dai T Truong
(74) *Attorney, Agent, or Firm* — Quarles & Brady LLP

(57) ABSTRACT

Some embodiments of the invention provide a method for processing requests for performing operations on resources in a software defined datacenter (SDDC). The resources are software-defined (SD) resources in some embodiments. The method initially receives a request to perform an operation with respect to a first resource in the SDDC. The method identifies a policy that matches (i.e., is applicable to) the received request for the first resource by comparing a set of attributes of the request with sets of attributes of a set of policies that place constraints on operations specified for resources. In some embodiments, several sets of attributes for several policies can be expressed for resources at different hierarchal resource levels of the SDDC. The method rejects the received request when the identified policy speci-
(Continued)

fies that the requested operation violates a constraint on operations specified for the first resource.

19 Claims, 7 Drawing Sheets

Related U.S. Application Data continuation of application No. 16/200,678, filed on Nov. 27, 2018, now Pat. No. 10,942,788.

(51) Int. Cl.
  *H04L 67/1074* (2022.01)
  *H04L 67/1087* (2022.01)
  *H04L 67/60* (2022.01)

(52) U.S. Cl.
  CPC ........ *H04L 63/101* (2013.01); *H04L 67/1076* (2013.01); *H04L 67/1089* (2013.01); *H04L 67/60* (2022.05); *G06F 2209/506* (2013.01)

(58) Field of Classification Search
  USPC ....................................................... 709/226
  See application file for complete search history.

(56) References Cited

U.S. PATENT DOCUMENTS

| | | | |
|---|---|---|---|
| 7,869,439 B1 | 1/2011 | Ramberg et al. | |
| 7,890,543 B2 | 2/2011 | Hunt et al. | |
| 7,912,955 B1 | 3/2011 | Machiraju et al. | |
| 8,627,442 B2 | 1/2014 | Ji et al. | |
| 8,683,560 B1 | 3/2014 | Brooker et al. | |
| 9,152,803 B2 | 10/2015 | Biswas et al. | |
| 9,225,638 B2 | 12/2015 | Jain et al. | |
| 9,258,312 B1 | 2/2016 | O'Neill et al. | |
| 9,531,590 B2 | 12/2016 | Jain et al. | |
| 9,536,077 B2 | 1/2017 | Bignon et al. | |
| 9,590,901 B2 | 3/2017 | Tubaltsev et al. | |
| 9,594,546 B1 | 3/2017 | Todd et al. | |
| 9,674,275 B1 | 6/2017 | Engers et al. | |
| 9,755,898 B2 | 9/2017 | Jain et al. | |
| 9,774,537 B2 | 9/2017 | Jain et al. | |
| 9,813,509 B1 | 11/2017 | Visser et al. | |
| 9,825,810 B2 | 11/2017 | Jain et al. | |
| 9,935,827 B2 | 4/2018 | Jain et al. | |
| 9,979,641 B2 | 5/2018 | Jain et al. | |
| 10,027,766 B2 * | 7/2018 | Greenan | H04L 67/1097 |
| 10,095,669 B1 | 10/2018 | Karppanen | |
| 10,122,735 B1 | 11/2018 | Wohlgemuth | |
| 10,129,077 B2 | 11/2018 | Jain et al. | |
| 10,135,737 B2 | 11/2018 | Jain et al. | |
| 10,135,874 B1 * | 11/2018 | Perry | G06F 21/54 |
| 10,193,977 B2 | 1/2019 | Ke et al. | |
| 10,205,701 B1 | 2/2019 | Voss et al. | |
| 10,225,137 B2 | 3/2019 | Jain et al. | |
| 10,257,095 B2 | 4/2019 | Jain et al. | |
| 10,270,796 B1 | 4/2019 | Veeraswamy et al. | |
| 10,320,679 B2 | 6/2019 | Jain et al. | |
| 10,341,233 B2 | 7/2019 | Jain et al. | |
| 10,496,605 B2 | 12/2019 | Melnik et al. | |
| 10,516,568 B2 | 12/2019 | Jain et al. | |
| 10,547,521 B1 | 1/2020 | Roy et al. | |
| 10,594,743 B2 | 3/2020 | Hong et al. | |
| 10,609,091 B2 | 3/2020 | Hong et al. | |
| 10,613,888 B1 | 4/2020 | Mentz et al. | |
| 10,628,144 B2 | 4/2020 | Myneni et al. | |
| 10,652,143 B2 | 5/2020 | Ravinoothala et al. | |
| 10,693,782 B2 | 6/2020 | Jain et al. | |
| 10,708,368 B1 | 7/2020 | Young et al. | |
| 10,725,836 B2 | 7/2020 | Savenkov et al. | |
| 10,795,909 B1 | 10/2020 | Bond et al. | |
| 10,812,337 B2 | 10/2020 | Vaidya et al. | |
| 10,841,226 B2 | 11/2020 | Mariappan et al. | |
| 10,846,788 B1 * | 11/2020 | Klein | H04L 47/83 |
| 10,860,444 B2 | 12/2020 | Natanzon | |
| 10,942,788 B2 | 3/2021 | Palavalli et al. | |
| 10,944,691 B1 | 3/2021 | Raut et al. | |
| 10,951,661 B1 | 3/2021 | Medan et al. | |
| 10,972,341 B2 | 4/2021 | Mudigonda | |
| 10,972,386 B2 | 4/2021 | Mackie et al. | |
| 11,074,091 B1 | 7/2021 | Nayakbomman et al. | |
| 11,086,700 B2 | 8/2021 | Myneni et al. | |
| 11,159,366 B1 | 10/2021 | Gawade et al. | |
| 11,190,491 B1 | 11/2021 | Kaciulis et al. | |
| 11,194,483 B1 | 12/2021 | Dontu et al. | |
| 11,252,190 B1 * | 2/2022 | Sharifi Mehr | H04L 63/10 |
| 11,277,309 B2 | 3/2022 | Vaidya et al. | |
| 11,316,822 B1 | 4/2022 | Gawade et al. | |
| 11,436,057 B2 | 9/2022 | Shen et al. | |
| 11,500,688 B2 | 11/2022 | Liu et al. | |
| 11,570,146 B2 | 1/2023 | Liu et al. | |
| 11,606,254 B2 | 3/2023 | Liu et al. | |
| 11,671,400 B2 | 6/2023 | Zhou et al. | |
| 11,671,401 B2 | 6/2023 | Singh et al. | |
| 11,689,425 B2 | 6/2023 | Vaidya et al. | |
| 11,689,497 B2 | 6/2023 | Shen et al. | |
| 11,748,170 B2 | 9/2023 | Palavalli et al. | |
| 2004/0098154 A1 | 5/2004 | McCarthy | |
| 2005/0129019 A1 | 6/2005 | Cheriton | |
| 2007/0244962 A1 | 10/2007 | Laadan et al. | |
| 2007/0245334 A1 | 10/2007 | Nieh et al. | |
| 2007/0251998 A1 | 11/2007 | Belenki | |
| 2010/0149996 A1 | 6/2010 | Sun | |
| 2010/0177674 A1 | 7/2010 | Aggarwal | |
| 2010/0211815 A1 | 8/2010 | Mankovskii et al. | |
| 2010/0246545 A1 | 9/2010 | Berzin | |
| 2010/0293378 A1 | 11/2010 | Xiao et al. | |
| 2011/0161988 A1 | 6/2011 | Kashyap | |
| 2011/0194494 A1 | 8/2011 | Aso et al. | |
| 2011/0282936 A1 | 11/2011 | Chekhanovskiy et al. | |
| 2011/0289508 A1 | 11/2011 | Fell et al. | |
| 2012/0117226 A1 | 5/2012 | Tanaka et al. | |
| 2012/0150912 A1 | 6/2012 | Ripberger | |
| 2012/0304275 A1 | 11/2012 | Ji et al. | |
| 2013/0018994 A1 | 1/2013 | Flavel et al. | |
| 2013/0019314 A1 | 1/2013 | Ji et al. | |
| 2013/0125230 A1 | 5/2013 | Koponen et al. | |
| 2013/0174168 A1 | 7/2013 | Abuelsaad et al. | |
| 2013/0266019 A1 | 10/2013 | Qu et al. | |
| 2013/0283339 A1 * | 10/2013 | Biswas | G06F 21/604 |
| | | | 726/1 |
| 2014/0036730 A1 | 2/2014 | Nellikar et al. | |
| 2014/0056298 A1 | 2/2014 | Vobbilisetty et al. | |
| 2014/0129690 A1 | 5/2014 | Jaisinghani et al. | |
| 2014/0164897 A1 | 6/2014 | Yucel et al. | |
| 2014/0223556 A1 | 8/2014 | Bignon et al. | |
| 2014/0237100 A1 | 8/2014 | Cohn et al. | |
| 2014/0258479 A1 | 9/2014 | Tenginakai et al. | |
| 2015/0063166 A1 | 3/2015 | Sif et al. | |
| 2015/0081767 A1 | 3/2015 | Evens | |
| 2015/0100704 A1 | 4/2015 | Davie et al. | |
| 2015/0172093 A1 | 6/2015 | Kaneko et al. | |
| 2015/0222598 A1 | 8/2015 | Koponen et al. | |
| 2015/0249574 A1 | 9/2015 | Zhang | |
| 2015/0263899 A1 | 9/2015 | Tubaltsev et al. | |
| 2015/0263946 A1 | 9/2015 | Tubaltsev et al. | |
| 2015/0317169 A1 | 11/2015 | Sinha et al. | |
| 2015/0348044 A1 | 12/2015 | Smith | |
| 2015/0379281 A1 | 12/2015 | Feroz et al. | |
| 2016/0036860 A1 | 2/2016 | Xing et al. | |
| 2016/0080422 A1 | 3/2016 | Belgodere et al. | |
| 2016/0094454 A1 | 3/2016 | Jain et al. | |
| 2016/0094457 A1 | 3/2016 | Jain et al. | |
| 2016/0094650 A1 | 3/2016 | Rio | |
| 2016/0094661 A1 | 3/2016 | Jain et al. | |
| 2016/0132512 A1 * | 5/2016 | Ripberger | G06F 21/6218 |
| | | | 707/694 |
| 2016/0182293 A1 | 6/2016 | Benedetto et al. | |
| 2016/0217301 A1 | 7/2016 | Watanabe et al. | |
| 2016/0239326 A1 | 8/2016 | Kaplan et al. | |
| 2016/0241436 A1 | 8/2016 | Fourie et al. | |
| 2016/0254964 A1 | 9/2016 | Benc | |

(56) References Cited

U.S. PATENT DOCUMENTS

| | | |
|---|---|---|
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0250869 A1* | 8/2017 | Voellmy ............... H04L 43/14 |
| 2017/0286698 A1 | 10/2017 | Shetty et al. |
| 2017/0317954 A1 | 11/2017 | Masurekar et al. |
| 2017/0324781 A1 | 11/2017 | Hu et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0019969 A1 | 1/2018 | Murthy |
| 2018/0063194 A1 | 3/2018 | Vaidya et al. |
| 2018/0083835 A1 | 3/2018 | Cole et al. |
| 2018/0089249 A1 | 3/2018 | Collins et al. |
| 2018/0089299 A1 | 3/2018 | Collins et al. |
| 2018/0114012 A1 | 4/2018 | Sood et al. |
| 2018/0115551 A1* | 4/2018 | Cole .................... H04L 47/783 |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068500 A1 | 2/2019 | Hira |
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0213004 A1 | 7/2019 | Zhu et al. |
| 2019/0229987 A1 | 7/2019 | Shelke et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0045519 A1* | 2/2020 | Raleigh ............... H04M 15/765 |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0382584 A1 | 12/2020 | Basavaiah et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0218652 A1 | 7/2021 | Raut et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0091868 A1 | 3/2022 | Malleni et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1 | 9/2022 | Sharma et al. |
| 2022/0303246 A1 | 9/2022 | Miriyala et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0043362 A1 | 2/2023 | Kita et al. |
| 2023/0070224 A1 | 3/2023 | Duo et al. |
| 2023/0104568 A1 | 4/2023 | Miriyala et al. |
| 2023/0179484 A1 | 6/2023 | Liu et al. |
| 2023/0179573 A1 | 6/2023 | Sosnovich et al. |
| 2023/0231741 A1 | 7/2023 | Tang et al. |
| 2023/0231827 A1 | 7/2023 | Tang et al. |
| 2023/0244591 A1 | 8/2023 | Sun et al. |

(56) References Cited

U.S. PATENT DOCUMENTS

| | | |
|---|---|---|
| 2023/0297404 A1 | 9/2023 | Shen et al. |
| 2023/0300002 A1 | 9/2023 | Shen et al. |

FOREIGN PATENT DOCUMENTS

| | | |
|---|---|---|
| CA | 3103930 A1 | 12/2019 |
| CA | 3107455 A1 | 2/2020 |
| CN | 105897946 A | 8/2016 |
| CN | 106664321 A | 5/2017 |
| CN | 106789367 A | 5/2017 |
| CN | 107947961 A | 4/2018 |
| CN | 108809722 A | 11/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| CN | 113141386 A | 7/2021 |
| EP | 2464151 A2 | 6/2012 |
| EP | 2464152 A2 | 6/2012 |
| EP | 2830270 A1 | 1/2015 |
| EP | 3316532 A1 | 5/2018 |
| EP | 3617879 A1 | 3/2020 |
| EP | 3791355 A1 | 3/2021 |
| JP | 2011070707 A | 4/2011 |
| JP | 2012099048 A | 5/2012 |
| JP | 2014535213 A | 12/2014 |
| JP | 2015115043 A | 6/2015 |
| JP | 2018523932 A | 8/2018 |
| WO | 2011159842 A2 | 12/2011 |
| WO | 2013063330 A1 | 5/2013 |
| WO | 2016160523 A1 | 10/2016 |
| WO | 2018044341 A1 | 3/2018 |
| WO | 2018044352 A1 | 3/2018 |
| WO | 2019241086 A1 | 12/2019 |
| WO | 2020041073 A1 | 2/2020 |
| WO | 2020041074 A1 | 2/2020 |
| WO | 2021196080 A1 | 10/2021 |
| WO | 2022026028 A1 | 2/2022 |
| WO | 2022204941 A9 | 10/2022 |
| WO | 2023133797 A1 | 7/2023 |
| WO | 2023173404 A1 | 9/2023 |

OTHER PUBLICATIONS

Author Unknown, "NSX and Micro-segmentation," Jan. 3, 2017, 2 pages, retrieved from https://www.youtube.com/watch?v=1_QtISXaxkE.

Author Unknown, "NSX Policy API: Getting Started Guide," Technical White Paper, Sep. 2019, 28 pages, VMware, Inc.

Author Unknown, "VMware NSX for vSphere 6.4—Application Rule Manager Enhancements," Jan. 20, 2018, 2 pages, retrieved from https://www.youtube.com/watch?v=r3IKNkt5mi8.

Author Unknown, "VMware NSX-T 2.4: Advancing NSX Everywhere for Everyone," Feb. 27, 2019, 2 pages, retrieved from https://www.youtube.com/watch?v=IqPyRBWABHg.

Patni, Sanjay, "Pro RESTful APIs," Month Unknown 2017, 136 pages, Apress, New York City, NY, USA.

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

Abwnawar, Nasser, "A Policy-Based Management Approach to Security in Cloud Systems," Feb. 2020, 184 pages, De Monfort University, Leicester, UK.

Author Unknown, "Advanced Networking Features in Kubernetes and Container Bare Metal," Document 606835-001, Dec. 2018, 42 pages, Intel Corporation.

Author Unknown, "Chapter 4: Default Security Policy," IBM Security Access Manager Version 9.0, Oct. 2015, 18 pages.

Author Unknown, "Containers and Container Networking for Network Engineers: VMware NSX Container Networking," Jan. 2018, 58 pages, VMware, Inc.

Author Unknown, "E-Security Begins with Sound Security Policies," Jun. 14, 2001, 23 pages, Symantec Corporation.

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

Author Unknown, "NSX vSphere API Guide—NSX 6.2 for vSphere," Jan. 6, 2017, 400 pages, VMware, Inc.

Author Unknown, "OpenShift Container Platform 4.6," Mar. 3, 2021, 41 pages, Red Hat, Inc.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-Published Commonly Owned U.S. Appl. No. 18/211,360, filed Jun. 19, 2023, 41 pages, VMware, Inc.

PCT International Search Report and Written Opinion of Commonly Owned International Patent Application PCT/US2019/036201, mailed Jul. 26, 2019, 14 pages, International Searching Authority (EPO).

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

Rouse, Margaret, "What is SDDC (software-defined data center)?—Definition from WhatIs.com," Mar. 2017, 5 pages, TechTarget.com.

Sayfan, Gigi, "Mastering Kubernetes: Automating container deployment and management," May 2017, 426 pages, Packt Publishing, Birmingham, UK.

Wodicka, Brent, "A Developer's Guide to Container Orchestration, Kubernetes, & AKS," Mar. 19, 2019, 5 pages, AIS, Reston, VA, USA.

* cited by examiner

```
"target":{                                               ⎫
    "target_resource_type":"CommunicationEntry",         |
    "attribute":"services",                              |
    "path_prefix":"/tenantT/domains/{{DOMAIN}}/edge-communication-maps/default/communication-entries/"
},                                                       |
"constraint_expression":{                                |
    "resource_type":"RelatedAttributeConditionalExpression",
    "related_attribute":{                                |
        "attribute":"destinationGroups"                  |
    },                                                   |  200
    "condition":{                                        |
        "operator":"INCLUDES",                           |
        "rhs_value":["/tenantT/domains/mgw/groups/VCENTER"],
        "value_constraint":{                             |
            "operator":"INCLUDES",                       |
            "values":["/tenantT/services/HTTP","/tenantT/services/HTTPS"]
        }                                                |
    }                                                    |
}                                                        ⎭
```

*Figure 2*

```
curl --request PATCH \
--url 'https://{{PolicyManager}}/policy/api/v1/tenantT/constraints/{{DEST_RESTRICT_SERVICES}}' \
--header 'Authorization: Basic YWRtaW46QERtaW4=' \
--header 'Content-Type: application/json' \
--data '{
    "target":{
        "target_resource_type":"CommunicationEntry",
        "attribute":"services",
        "path_prefix":"/tenantT/domains/{{DOMAIN}}/edge-communication-maps/default/communication-entries/"
    },
    "constraint_expression":{
        "resource_type":"RelatedAttributeConditionalExpression",
        "related_attribute":{
            "attribute":"destinationGroups"
        },
        "condition":{
            "operator":"INCLUDES",
            "rhs_value":["/tenantT/domains/gw/groups/VCENTER"],
            "value_constraint":{
                "operator":"INCLUDES",
                "values":["/tenantT/services/HTTP","/tenantT/services/HTTPS"]
            }
        }
    }
}'
```

*Figure 4*

```
"target": {
    "target_resource_type": "CommunicationEntry",
    "attribute": "action",
    "path_prefix": "/tenantT/domains/{{DOMAIN}}/edge-communication-maps/default/communication-entries/"
},
"constraint_expression": {
    "resource_type": "ValueConstraintExpression",
    "operator": "EQUALS",
    "values": ["ALLOW"]
}
}
```

*Figure 5*

POLICY CONSTRAINT FRAMEWORK FOR AN SDDC

CLAIM OF BENEFIT TO PRIOR APPLICATIONS

This application is a continuation application of U.S. patent application Ser. No. 17/176,191, filed Feb. 16, 2021, now published as U.S. Patent Publication 2021/0165695. U.S. patent application Ser. No. 17/176,191 is a continuation application of U.S. patent application Ser. No. 16/200,678, filed Nov. 27, 2018, now issued as U.S. Pat. No. 10,942,788. U.S. patent application Ser. No. 16/200,678 claims the benefit under 35 U.S.C. 119(a)-(d) to Foreign Application Serial No. 201841022440 filed in India entitled "POLICY CONSTRAINT FRAMEWORK FOR AN SDDC", on Jun. 15, 2018, by VMware, Inc. Indian Patent Application 201841022440, U.S. patent application Ser. No. 16/200,678, now issued as U.S. Pat. No. 10,942,788, and U.S. patent application Ser. No. 17/176,191, now published as U.S. Patent Publication 2021/0165695, are incorporated in their entirety by reference for all purposes.

BACKGROUND

Today, software defined datacenters (SDDC) are an important part of private and public clouds. To manage SDDCs, a wide and varying type of organization requirements have to be enforced on the resources provided to their users. These include customizations/policies that are highly specific to each SDDC. These requirements go beyond Role Based Access Control (RBAC). For example, these requirements could be firewall policies such as (1) default firewall policy is whitelisting (do not allow any communication unless opened with explicit firewall rule), (2) for a given workload/app, do not allow selected type of traffic, (3) only certain source network addresses can send traffic to a given workload, or (4) do not allow universal deny-all or allow-all rule for a specified router or workload. Supporting these policies adds further challenges when the infrastructure services are truly multi-tenant with each tenant bringing its own policies.

BRIEF SUMMARY

Some embodiments of the invention provide a method for processing requests for performing operations on resources in a software defined datacenter (SDDC). The resources are software-defined (SD) resources in some embodiments. The method initially receives a request to perform an operation with respect to a first resource in the SDDC. The method identifies a policy that matches (i.e., is applicable to) the received request for the first resource by comparing a set of attributes of the request with sets of attributes of a set of policies that place constraints on operations specified for resources. In some embodiments, several sets of attributes for several policies can be expressed for resources at different hierarchal resource levels of the SDDC.

The method rejects the received request when the identified policy specifies that the requested operation violates a constraint on operations specified for the first resource. On the other hand, the method in some embodiments performs the operation associated with the received request when the identified policy specifies that the requested operation satisfies a constraint on operations specified for the first resource. In other embodiments, the method performs this operation only when the request does not violate a constraint of any policy that matches the request. In some embodiments, a matching policy can be expressly specified for the first resource or for the resource's type or can be indirectly specified for the first resource when it is defined for a second resource that is a parent resource of the first resource in the hierarchical resource levels of the SDDC.

In some embodiments, the policies in the set of policies are defined in a declarative format. Also, in some embodiments, examples of resources include forwarding elements (e.g., managed software switches and routers, logical switches and routers implemented by the managed software switches and routers, etc.), physical or logical networks, physical or logical network segments, physical or logical network interfaces, compute elements (e.g., virtual machines, containers, etc.), and service middlebox modules (e.g., service VMs or modules that perform middlebox service operations such as firewall operations, load balancing operations, network address translation operations, encryption operations, intrusion detection operations, intrusion prevention operations, etc.).

The method in some embodiments receives several policies before receiving the request and stores each of these policies in a storage that it uses to identify policies that match subsequently received requests. A received policy in some embodiments includes a target that specifies a set of one or more datacenter resources to which the policy applies. It also includes an expression that specifies a constraint on operations on the specified resource set. The received policies are expressed in a declarative format in some embodiments.

The target of each policy in some embodiments includes a resource type for the specified resource set, and a path prefix that identifies the specified resource set in the resource hierarchy of the datacenter. In some embodiments, an expression for a received policy specifies one or more constraint on operations that can be specified on the policy's target resource set. One example of a constraint is a value constraint that restricts a value of an attribute of a resource that is a target of the policy. In some embodiments, the value constraint includes an operator that is one of an include operator, an exclude operator or an equal operator. Another example of a constraint is an entity instance count constraint that restricts number of instances of the target resource. Still another example is a related attribute constraint that restricts a value of a secondary attribute of the target resource that has a primary attribute defined by a value constraint.

When the first resource that is the target operation of the received request is at a particular level in the resource hierarchy, the method in some embodiments identifies a policy associated with the first resource by comparing the request's set of attributes with attribute sets of policies specified for the first resource or parent resources of the first resource on the resource hierarchy. Examples of requested operations on target resources in some embodiments include creation or modification of forwarding rules for forwarding data messages, creation or modification of service rules for performing middlebox service operations on data messages, and deployments or modification of deployments of machine and/or network elements in the datacenter.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawing.

BRIEF DESCRIPTION OF FIGURES

The novel features of the invention are set forth in the appended claims. However, for purposes of explanation, several embodiments of the invention are set forth in the following figures.

FIG. 2 illustrates an example of a received policy.

FIG. 4 illustrates an example to show how the policy of FIG. 2 is provided to the policy input processor in some embodiments.

FIG. 5 illustrates another example of a policy.

DETAILED DESCRIPTION

Figure 1:
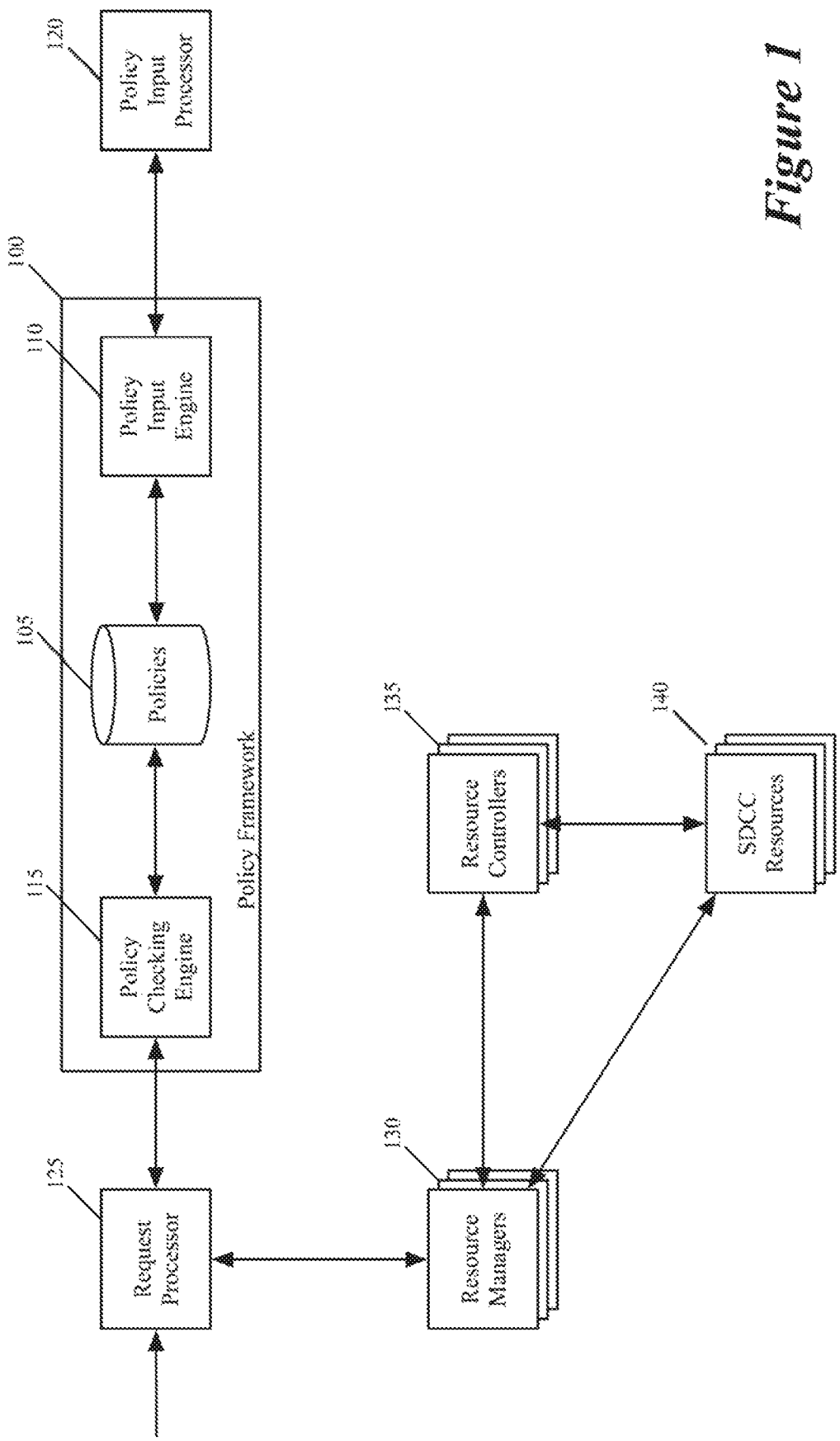
FIG. 1 illustrates an example of a policy framework of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a policy framework for validating requests for performing operations on resources in a software defined datacenter (SDDC). The resources are software-defined (SD) resources in some embodiments. When the policy framework receives a request to perform an operation with respect to a first resource in the SDDC, it identifies one or more policies that match (i.e., are applicable to) the received request for the first resource by comparing a set of attributes of the request with sets of attributes of a set of policies that place constraints on operations specified for resources. In some embodiments, several sets of attributes for several policies can be expressed for resources at different hierarchal resource levels of the SDDC.

The policy framework rejects the received request when policy identified for the received request specifies that the requested operation violates a constraint on operations specified for the first resource. On the other hand, the framework validates this operation when the request does not violate any constraint of any identified policy that matches the request. In some embodiments, a matching policy can be expressly specified for the first resource or for the resource's type or can be indirectly specified for the first resource when it is defined for a second resource that is a parent resource of the first resource in the hierarchical resource levels of the SDDC.

In some embodiments, the policies in the set of policies are defined in a declarative format. Also, in some embodiments, examples of resources include forwarding elements (e.g., managed software switches and routers, logical switches and routers implemented by the managed software switches and routers, etc.), physical or logical networks, physical or logical network segments, physical or logical network interfaces, compute elements (e.g., virtual machines, containers, etc.), and service middlebox modules (e.g., service VMs or modules that perform middlebox service operations such as firewall operations, load balancing operations, network address translation operations, encryption operations, intrusion detection operations, intrusion prevention operations, etc.).

When the first resource that is the target operation of the received request is at a particular level in the resource hierarchy, the policy framework in some embodiments identifies a policy associated with the first resource by comparing the request's set of attributes with attribute sets of policies specified for the first resource or parent resources of the first resource on the resource hierarchy. Examples of requested operations on target resources in some embodiments include creation or modification of forwarding rules for forwarding data messages, creation or modification of service rules for performing middlebox service operations on data messages, and deployments or modification of deployments of machine and/or network elements in the datacenter.

FIG. 1 illustrates an example of a policy framework 100 of some embodiments. As shown, this framework includes a policy storage 105, a policy input engine 110, and a policy checking engine 115. As further described below, this framework interacts with a policy input processor 120 to store policies in the policy storage 105 and interacts with a request processor 125 to validate requests to perform operations on several SDDC resources 140.

For any request that the framework validates, the request processor 125 uses one or more resource managers 130 to perform the operation associated with the request. As further described below, the resource manager 130 performs the operation either by directly interacting with the SDDC resources or indirectly through local and/or remote controllers. In some embodiments, the request processor 125, the policy framework 100, the input processor 120, and resource managers 130 execute on different machines (e.g., VMs, containers, standalone servers, etc.) in one or more datacenters and communicate with each other through a network.

In some embodiments, the policy input processor 120 is an API processor that handles input-policy API commands received through an API gateway of an SDDC management system to which the policy framework belongs, or through a user interface that the SDDC management system presents to administrators of the SDDC, the SDDC tenants, and/or SDDC networks. Through these API commands, the policy input processor 120 receives several policies and stores each of these policies in a storage that it uses to identify policies that match subsequently received requests.

Figure 3:
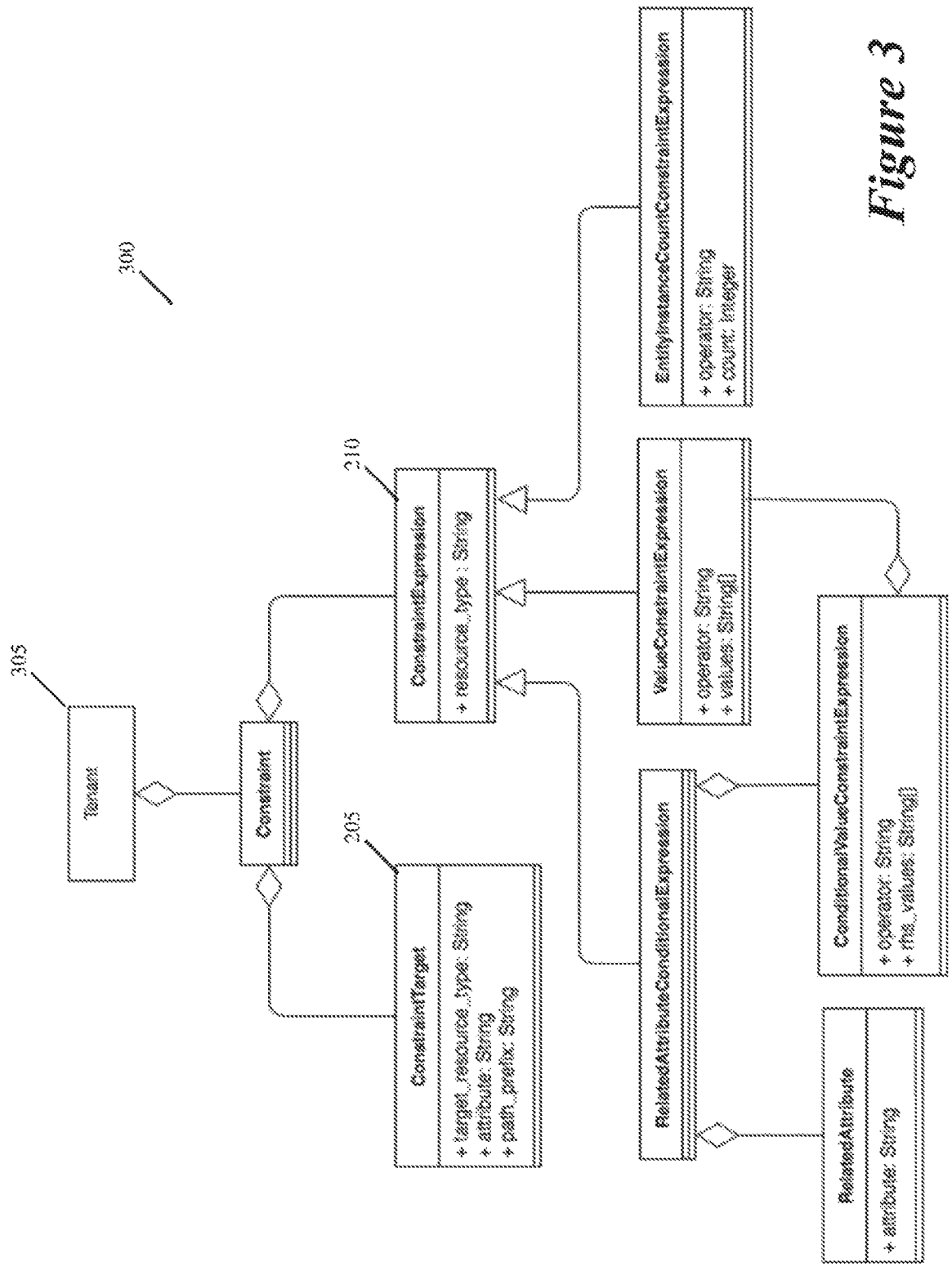
FIG. 3 presents an object diagram of the different components of a policy in some embodiments.

In some embodiments, the received policies are expressed in a declarative format. FIG. 2 illustrates an example of a received policy 200. As further described below, this policy restricts access to destination machines in a destination group to http and https accesses. As shown in FIG. 2, a policy includes (1) a target 205 that specifies a set of one or more datacenter resources to which the policy applies, and (2) an expression 210 that specifies a constraint on operations on the target resource set. This is further illustrated in FIG. 3, which presents an object diagram 300 of the different components of a policy in some embodiments. In the example illustrated in FIG. 3, the policy is specified for a given tenant 305.

The target of each policy in some embodiments includes (1) a type 212 of the target resource set, (2) a name 214 of the target resource set, and (3) a path prefix 216 that identifies the target resource set in the resource hierarchy of the datacenter. As shown, the policy path 216 in some embodiments is in a URL format to uniquely identify a resource or set of resources in a datacenter. In some embodiments, the type and path prefix attributes of the target 205 are used to determine whether a policy is applicable to (i.e., is associated with) an API request (i.e., whether the policy matches a set of attributes associated with the API request).

The path prefix 216 for a policy is specified by reference to one or more resources in the resource hierarchy of the SDDC. In the examples illustrated in FIG. 2 and some of the other figures of this application, the resource hierarchy of the data center includes the following resources: tenant, domain, communication maps, and communication entries. The tenant is a tenant entity (e.g., business entity) that is a tenant of a multi-tenant datacenter. A domain is a workload under a tenant. A communication map is a set of communication rules under a domain that are applicable to communication from/to VMs in the domain, while a communication entry is a single communication rule (e.g., firewall rule) under a communication map.

In some embodiments, a workload is an application or system that is deployed by a user for a specific purpose. One example of a workload includes all the VMs deployed for running outlook application in an enterprise. Another example includes VMs deployed using three tier application templates that specify webservers, application servers, database servers, and zero or more middlebox service machines (e.g., load balancers, firewalls, etc.) between the different tier applications. Other examples of workloads include Sharepoint Workloads, Windows Server VMs, Windows VDI Services VMs, etc.

Examples of communication maps in some embodiments include (1) distributed firewalls (firewall machines implemented on host computers with compute node VMs and/or containers), (2) edge firewall appliances or machines operating at north/south boundary of physical or logical networks, and (3) inserted service modules executing on host computers to provide other middlebox service operations for compute node VMs and/or containers executing on the host computers. In some embodiments, an example of a communication entry includes a tuple that includes the following information: identifier, name, description, source groups, destination groups, services, action, and scope.

In some embodiments, a path prefix can identify a resource or resource set by specifying the path through the resource hierarchy to the identified resource or resource set from the root with all taxonomical parents included in the path. For example, a first policy can be specified for all resources associated with a tenant VMware by specifying the path as/vmware. A second policy can be specified for the Outlook workload of the tenant VMware by using the path/vmware/domains/Outlook. A third policy can be specified for the web-profile of the Outlook workload of the tenant VMware by specifying a path/vmware/domains/Outlook/communication-maps/web-profile. A fourth policy can be specified for the open browser access of Outlook workload of the tenant VMware by using/vmware/domains/Outlook/communicationmaps/web-profile/communication-entries/open-browser-access. More generally, the format for path for a security policy can be specified as: /<tenant-name>/domains/<workload-name>/communication-maps/<security-policy-name>/communication-entries/<rule-name>.

In the above-described examples, the first policy is applicable to any resource to which the second, third and fourth policies are applicable, the second policy is applicable to any resource to which the third and fourth policies are applicable, and the third policy is applicable to any resource to which the fourth policy is applicable. This is because the first policy's path prefix is a subset of the path prefix of the second, third and fourth policies, the second policy's path prefix is a subset of the path prefix of the third and fourth policies, and the third policy's path prefix is a subset of the path prefix of the fourth policy. Under this approach, the policies that are applicable to a resource are policies that are specified for the resource or parent resources of the resource on the resource hierarchy. Once a policy has been identified as being applicable to a resource on which an operation is requested, then the policy's expression has to be analyzed to determine whether the policy specifies a constraint that allows, restricts or rejects this operation, as further described below.

Table 1 provides several other examples of path prefixes for some embodiments. These embodiments have several additional types of resources, including: provider to identify a router operated by an SDDC provider, interface to identify a network interface, network to identify a tenant network, segment to identify a tenant network segment, and load balancer to identify a load balancer machine or appliance in the datacenter.

TABLE 1

| Resource | Path |
| --- | --- |
| Firewall Rule | /infra/domains/<domain-name>/edge-communication-maps/default/communication-entries/<communication-entry-name> |
| Provider North South Logical Router | /infra/providers/<provider-name> |
| Tenant East West Logical Router | /infra/networks/<network-name> |
| Uplink Interface of Provider North South Logical Router | /infra/providers/<provider-name>/interfaces/<uplink-name> |
| Tenant Subnet | /infra/networks/<network-name>/segments/<segment-name> |
| Load Balancer | /infra/load-balancers/<lb-name> |

Some embodiments leverage path prefixes to specify one of the optional parameters for applying constraints as explained further below. However, other embodiments can replace this approach with another approach to use regular expressions to match or identify some prefixes. Hence, not all embodiments of the invention are limited to using hierarchical paths in the specified policies.

In some embodiments, an expression 210 for a received policy specifies one or more constraint on operations that can be specified on the policy's target resource set. One example of a constraint is a value constraint that restricts a value of an attribute of a resource that is a target of the policy. In some embodiments, the value constraint includes an operator that is one of an include operator, an exclude operator, or an equal operator. Another example of a constraint is an entity instance count constraint that restricts number of instances of the target resource (e.g., restricts number of VPNs, routers, gateways, load balancers, connection sessions, firewall rules, etc.).

Still another example is a related attribute constraint that restricts a value of a secondary attribute of the target resource that has a primary attribute defined by a value constraint. For example, the related attribute constraint can be used to define constraints like "if the destination for traffic is Accounting Workload then the allowed services are restricted to HTTPS and SSH". One of ordinary skill will realize that other embodiments include other types of constraint expressions.

The policy 200 illustrated in FIG. 2 restricts access to destination machines in a destination group to http and https accesses. Specifically, this policy specifies a constraint to be applied at an edge gateway of a tenant T's domain, as indicated by its path prefix 216. This constraint specifies that when a message is addressed to a destination group VCENTER, the message (i.e., the access) should be allowed only when the message's protocol is http or https (i.e., when the access uses http or https protocols).

FIG. 4 illustrates an example to show how the policy 200 of FIG. 2 is provided to the policy input processor in some embodiments. As shown, the policy 200 is provided in a CURL patch command 400 that starts with a CURL instruction followed by "request PATCH \". Next, the policy name is provided as a URL, followed by an authorization header and a content-type description that specifies that the data is in a JSON format. Finally, the policy 200 is provided as the data component of the CURL patch command.

FIG. 5 illustrates another example of a policy. This policy 500 specifies that any communication rule that is specified can only specify an Allow action at the edge gateways. This policy would prevent the administrators from defining rules that reject data messages at the edge gateways. This policy is used as a default firewall policy in a whitelisting (do not allow any communication unless opened with explicit firewall rule) approach that only allows administrators to specify firewall rules at the edge gateway that opens connections.

Figure 6:
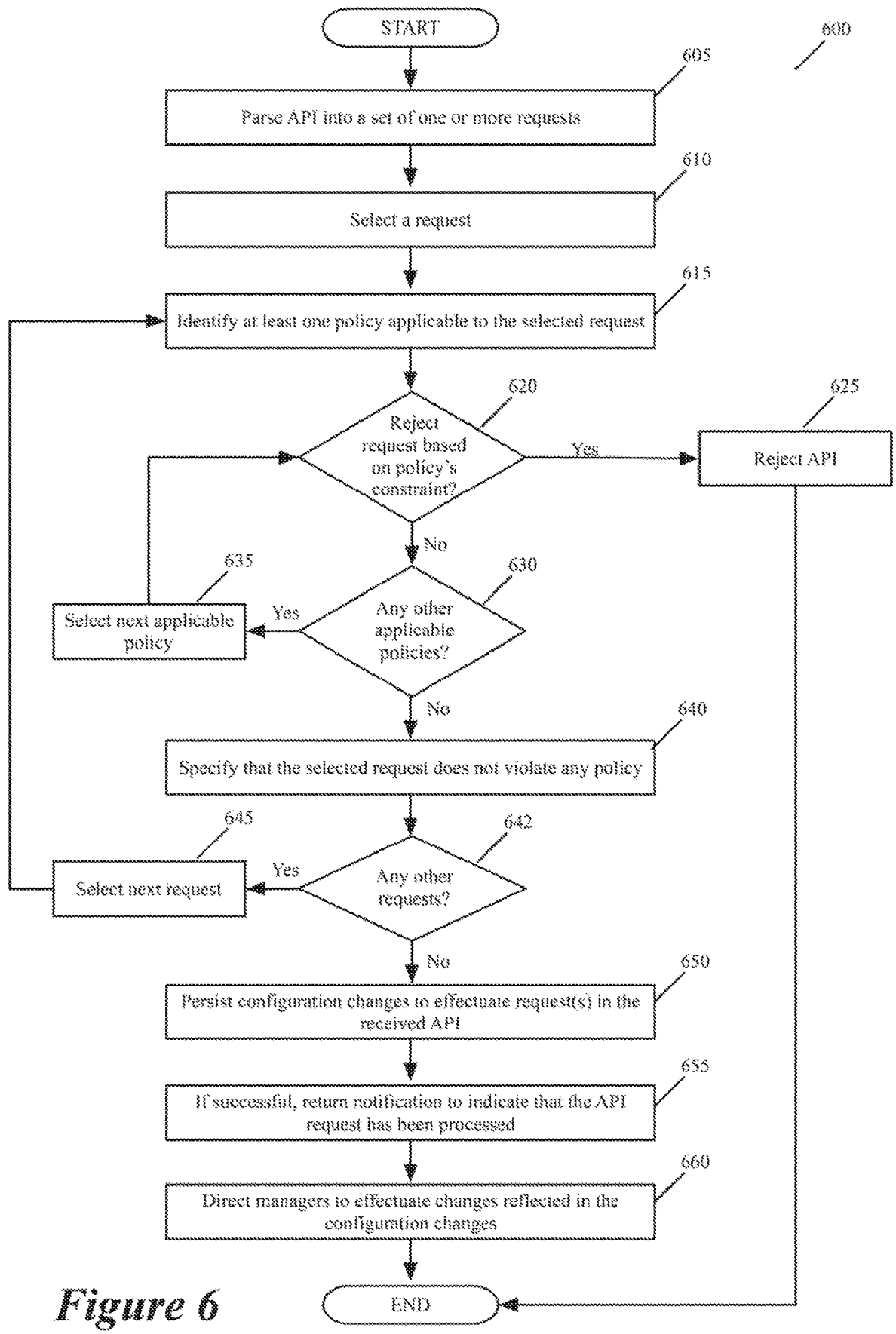
FIG. 6 illustrates a process that the request processor and policy framework perform to process an API regarding software-defined resources in the SDDC.

FIG. 6 illustrates a process 600 that the request processor 125 and policy framework 100 perform to process an API regarding SD resources in the SDDC. In some embodiments, the API is a hierarchical API that specifies one or more operations for one or more SD resources in the SDDC. Such a hierarchical API is further described in concurrently filed Indian Patent Application with the docket number E448. This concurrently filed application is incorporated herein by reference.

In the process 600, the request processor 125 initially parses (at 605) the received hierarchical API into a set of one or more requests for one or more SD resources in the SDDC. In some embodiments, the received API might not only include different requests for different resources, but also might include multiple requests for the one SD resource. The received API can in some embodiments just include multiple different requests for one SD resource. Each request specifies one operation to be performed on a resource in some embodiments, while in other embodiments a request can specify multiple operations to be performed on a resource.

After parsing the API into one or more requests, the request processor 125 calls the policy checking engine 115 to validate each request (i.e., to specify whether each request satisfies all the constraints in all the policies that are applicable to the SD resources referred to in the API). Hence, at 610, the request processor 125 selects a request parsed from the received API. The request processor 125 then directs (at 615) the policy checking engine 115 to identify one or more policies that are applicable to the selected request. Each request is associated with a resource in the resource hierarchy of the SDDC. As mentioned above, each resource can be the parent resource of several other child resources in the resource hierarchy in some embodiments.

At 615, the policy checking engine 115 compares a set of attributes of the selected request's resource with a policy's target to determine whether the policy is applicable to the resource. Specifically, to identify a policy that is applicable to the selected request's resource, the policy checking engine 115 compares one or more attributes of the selected request (e.g., the identifier of the request's associated resource) with one or more attributes specified in the target (e.g., path prefix and resource type) of each policy stored in the policy storage 105 to identify a policy with a matching attribute set (i.e., with an attribute set that matches the selected request's attribute set). For instance, for an API request to adjust web access to Outlook workloads, the policy checking engine 115 would identify the second, third, and fourth policies mentioned above (for the Outlook workload, this workload's web-profile, and this workload's browser access) as being applicable to the API request. In some embodiments, the policy storage 105 stores policies using the same schema in which the policies are defined (e.g., using the same schema as was described above by reference to FIGS. 2, 4, and 5).

After identifying one applicable policy, the policy checking engine determines (at 620) whether the identified policy's expression specifies a constraint that requires the selected request to be rejected. To make this determination, the policy checking engine compares the attribute set of the selected request (e.g., data message flow attributes when the request relates to forwarding operations or service operations on data message flows between machines in the SDDC, deployment attributes when the request relates to deployment of machines or network elements, etc.) with attributes that are specified for the constraint in the applicable policy's expression to ascertain whether the selected request violates the policy's constraint. Thus, while comparing the selected request's resource attribute set with the targets of policies to identify the applicability of the policies to the resource, the policy checking engine 115 compares the resource's attribute set with the expressions of the applicable policies to determine whether the request should be allowed or rejected.

For instance, when the API request requires the creation of a firewall rule, the policy checking engine 115 would identify the policy 500 of FIG. 5 as being an applicable policy and then would determine whether the firewall rule specifies an accept or reject operation. When the requested firewall rule specifies an accept operation, the policy checking engine would determine that the request satisfies the constraint specified by the policy 500, but when the firewall rule specifies a reject, the policy checking engine would determine that the request fails to meet the specified policy and would reject the request.

When the policy checking engine 115 determines (at 620) that the selected request violates the identified policy's constraint, it directs (at 625) the API processing engine 125 to reject the API and return a notification to the source of the API that it has been rejected. After the API processing engine 125 rejects the API, the process ends in some embodiments. In other embodiments, the process 600 does not end after it determines that the API violates at least one policy. In these embodiments, the API processing engine 125 directs the policy checking engine 115 to validate each request in the received API so that it can provide a report to the API source to identify all the policies that the rejected API violated.

When the policy checking engine 115 determines (at 620) that the selected request does not violate the identified policy's constraint, it determines (at 630) whether any other policy in the policy store 105 is applicable to the selected request. If so, this engine 115 selects (at 635) this policy and transitions back to 620 to determine whether this policy's expression specifies a constraint that the request violates. The process loops through 620-635 so long as it can find policies that are applicable to the request and that it has not yet processed. This looping ends when the engine 125 identifies a policy that has a constraint that the request violates or when the engine has finished analyzing policies that are applicable to the request.

When the policy checking engine 115 determines (at 630) that it has examined all policies that are applicable to the selected request, this engine informs (at 640) the API processing engine 125 that the selected request does not violate any policies. Next, at 642, the API processing engine 125 determines whether the received API has any other parsed requests that have not yet been validated by the policy checking engine 115. If so, the API processing engine 125 selects (at 645) the next request and returns to 615 to direct the policy checking engine 115 to validate this newly selected request (i.e., to check whether this request violates any constraint of any policy that is applicable to the request).

When the API processing engine 125 determines (at 642) that the received API has no other parsed requests that have not yet been validated by the policy checking engine 115, the API processing engine uses (at 650) one or more deployment engines (not shown) to persist the configuration change needed for processing the request(s) of the processed hierarchical API (i.e., to specify or change previously specified configuration data regarding any resources affected by the API). These deployment engines specify or change previously specified configuration data in configuration data storage(s) (not shown).

Once the configuration data has been persisted to the configuration data storage(s), the API processing engine 125 returns a notification to the source of the API to indicate that the API request has been processed. Next, at 660, the API processing engine directs one or more resource managers 130 to perform the operation(s) associated with the request(s) in the received API. Instead of being directed by the API processor 125, the deployment plugins direct the resource managers in other embodiments to distribute new or modified configuration data sets from the configuration data storage(s) to the resources.

In response to these notifications from the API processor or the deployment plugins, the resource managers then perform the operation(s) associated with the request(s) in the received API in these embodiments. As mentioned above, a resource manager can perform its operation either by directly interacting with the datacenter resources (e.g., host computers) to define or modify the desired resource (e.g., firewall service machines or modules) or indirectly through local and/or remote controllers, which interact with the datacenter resources to define or modify the desired resources.

After 660, the process 600 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
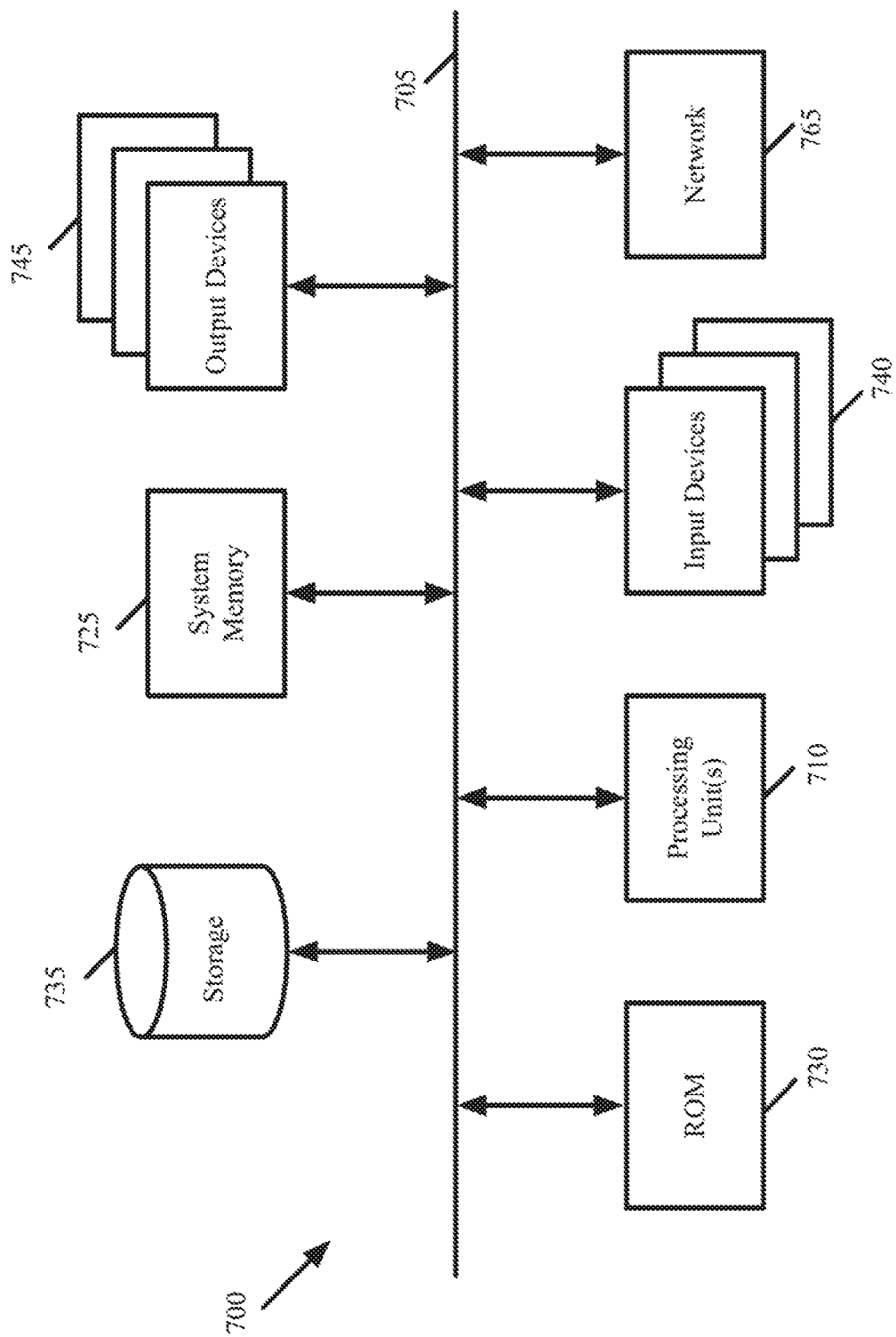
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random access memory.

The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet), or a network of networks (such as the Internet). Any or all components of computer system 700 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of processing requests for performing an operation on a first resource in a plurality of resources arranged in a particular hierarchy of resources of a datacenter, the method comprising:
    receiving a request to perform an operation with respect to the first resource in the plurality of resources arranged in the particular hierarchy of resources of the datacenter, said first resource being a parent resource of a child second resource in the hierarchy;
    identifying a policy applicable to the received request by comparing a set of attributes of the request with sets of attributes associated with a set of policies that are stored in a policy storage and that place constraints on operations specified for the plurality of resources, wherein a plurality of sets of attributes associated with a plurality of policies that are stored in the policy storage are attributes of a set of resources at different resource levels in the hierarchy; and
    rejecting the received request when the identified policy specifies that the requested operation violates a constraint on operations specified for the first resource.

2. The method of claim 1, wherein the policies in the set of policies that are stored in a policy storage are defined in a declarative format.

3. The method of claim 1, wherein the plurality of policies include a first policy stored in the policy storage and defined by reference to a first attribute associated with the first resource and a second policy stored in the policy storage and defined by reference to a second attribute associated with the second resource.

4. The method of claim 1 further comprising:
    receiving a plurality of policies before receiving the request,
    each policy comprising:
        a target that specifies a set of one or more datacenter resources to which the policy applies, and
        an expression that specifies a constraint on operations on the specified resource set; and
    storing the received policies in the policy storage that is checked while processing requests for operations associated with the plurality of resources.

5. The method of claim 4, wherein the target of each policy comprises:
    a resource type for the specified resource set, and
    a path prefix that identifies the specified resource set in the resource hierarchy of the datacenter.

6. The method of claim 5, wherein a first path prefix of a first target of a first policy stored in the policy storage is defined for a first parent resource, and specifies an applicability of the first policy to the first parent resource and a first child resource that is a child resource of the first parent resource in the hierarchical resource level.

7. The method of claim 4, wherein a plurality of expressions for a set of received policies comprises at least one of:
    a value constraint that restricts a value of an attribute of a resource that is a target of the policy, and an entity instance count constraint that restricts number of instances of the target resource.

8. The method of claim 7, wherein the value constraint includes an operator that is one of an include operator, an exclude operator or an equal operator.

9. The method of claim 4, wherein a plurality of expressions for a set of received policies comprises:
a value constraint that restricts a value of a first attribute of a resource that is a target of the policy, and
a related attribute constraint that restricts a value of a second attribute of the target resource.

10. A non-transitory machine readable medium storing a program for processing requests for performing operations on resources in a datacenter, the program comprising sets of instructions for:
receiving a request to perform an operation with respect to a first resource in a datacenter;
identifying a policy applicable to the received request by comparing a set of attributes of the request with sets of attributes associated with a set of policies that place constraints on operations specified for the resources, wherein a plurality of sets of attributes associated with a plurality of policies are attributes of resources at different hierarchal resource levels in the datacenter, wherein the first resource is a child of a second resource, and the identified policy is specified for the second resource and is identified by matching the set of attributes of the request to a set of attributes associated with the second resource; and
rejecting the received request when the identified policy specifies that the requested operation violates a constraint on operations specified for the second resource.

11. A non-transitory machine readable medium storing a program for processing requests for performing operations on resources in a datacenter, the program comprising sets of instructions for:
receiving a request to perform an operation with respect to a first resource in a datacenter;
identifying a policy applicable to the received request by comparing a set of attributes of the request with sets of attributes associated with a set of policies that are stored in a policy storage and that place constraints on operations specified for the resources, wherein a plurality of sets of attributes associated with a plurality of policies are attributes of resources at different hierarchal resource levels in the datacenter; and
rejecting the received request when the identified policy specifies that the requested operation violates a constraint on operations specified for the first resource;
wherein the first resource is a child of a second resource, and the identified policy is specified for the second resource.

12. The non-transitory machine readable medium of claim 11, wherein the program further comprises sets of instructions for:
receiving a plurality of policies before receiving the request,
each policy comprising:
a target that specifies a set of one or more datacenter resources to which the policy applies, and
an expression that specifies a constraint on operations on the specified resource set; and
storing the received policies in the policy storage that is checked while processing requests for operations associated with the resources.

13. The non-transitory machine readable medium of claim 12, wherein the target of each policy comprises:
a resource type for the specified resource set, and
a path prefix that identifies the specified resource set in the resource hierarchy of the datacenter.

14. The non-transitory machine readable medium of claim 12, wherein a plurality of expressions for a set of received policies comprises at least one of:
a value constraint that restricts a value of an attribute of a resource that is a target of the policy, and
an entity instance count constraint that restricts number of instances of the target resource.

15. The non-transitory machine readable medium of claim 12, wherein a plurality of expressions for a set of received policies comprises:
a value constraint that restricts a value of a first attribute of a resource that is a target of the policy, and
a related attribute constraint that restricts a value of a second attribute of the target resource.

16. The non-transitory machine readable medium of claim 11, wherein the first resource is at a particular level in the hierarchy, wherein comparing the attribute sets comprises comparing the request's set of attributes with attribute sets of policies specified for resources defined at the particular level in the hierarchy and resources defined at a level higher than the particular level in the resource hierarchy in the datacenter.

17. The non-transitory machine readable medium of claim 11, wherein the received request is a request to create or modify a forwarding rule for forwarding data messages, a request to create or modify a service rule for performing service operation on a data message, or a request to deploy or modify a machine or network element in the datacenter.

18. The non-transitory machine readable medium of claim 11, wherein the program is a policy framework,
each policy specifies a resource type that identifies a type of resource to which the policy applies,
an inclusion of the resource type in the policy allowing new resource types to be added to the policy framework without reprogramming the policy framework.

19. The non-transitory machine readable medium of claim 11, wherein the set of instructions for identifying the policy comprises sets of instructions for:
identifying all policies that are applicable to the received request, and
determining whether the received request satisfies all policies specified in each identified policy,
the program further comprising a set of instructions for rejecting the received request when the request does not satisfy the policy specified by any of the identified policies.

* * * * *